(12) United States Patent
Panosyan et al.

(10) Patent No.: US 9,252,596 B2
(45) Date of Patent: Feb. 2, 2016

(54) SYSTEM AND METHOD FOR REACTIVE POWER COMPENSATION IN POWER NETWORKS

(75) Inventors: Ara Panosyan, Munich (DE); Reigh Allen Walling, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1101 days.

(21) Appl. No.: 13/304,935

(22) Filed: Nov. 28, 2011

(65) Prior Publication Data

US 2013/0134789 A1    May 30, 2013

(51) Int. Cl.
| H02J 1/00 | (2006.01) |
| H02J 3/00 | (2006.01) |
| H02J 3/18 | (2006.01) |
| H02J 3/38 | (2006.01) |

(52) U.S. Cl.
CPC ............. *H02J 3/1835* (2013.01); *H02J 3/382* (2013.01); *H02J 3/383* (2013.01); *H02J 3/386* (2013.01); *Y02E 10/563* (2013.01); *Y02E 10/763* (2013.01); *Y02E 40/30* (2013.01); *Y10T 307/718* (2015.04)

(58) Field of Classification Search
CPC .................................. H02J 3/18; Y02E 40/30
USPC ......... 307/84, 52, 47, 153; 323/205; 700/286, 700/298
See application file for complete search history.

(56) References Cited

U.S. PATENT DOCUMENTS

| 5,734,257 | A  | 3/1998  | Schauder et al. |
| 6,188,205 | B1 | 2/2001  | Tanimoto et al. |
| 6,924,565 | B2 | 8/2005  | Wilkins et al.  |
| 7,224,081 | B2 | 5/2007  | Larsen          |
| 7,312,537 | B1 | 12/2007 | Walling         |
| 7,508,173 | B2 | 3/2009  | Zhou et al.     |
| 7,605,499 | B2 | 10/2009 | Skliutas et al. |
| 7,839,024 | B2 | 11/2010 | Cardinal et al. |
| 7,923,862 | B2 | 4/2011  | Cardinal et al. |
| 7,994,658 | B2 | 8/2011  | Cardinal et al. |
| 8,041,465 | B2 | 10/2011 | Larsen et al.   |

(Continued)

FOREIGN PATENT DOCUMENTS

| EP | 2325716 A1 | 5/2011  |
| EP | 2506383 A2 | 10/2012 |
| EP | 2551985 A2 | 1/2013  |

OTHER PUBLICATIONS

Nayeem Rahmat Ullah et al; Variable Speed Wind Turbines for Power System Stability Enhancement; IEEE Transactions on Energy Conversion, vol. 22, No. 1, Mar. 2007; pp. 52-60.

(Continued)

*Primary Examiner* — Rexford Barnie
*Assistant Examiner* — Rasem Mourad
(74) *Attorney, Agent, or Firm* — Ann M. Agosti

(57) ABSTRACT

A reactive power compensation method includes generating a variable power factor curve for at least one power generator based on information regarding network parameters; obtaining a value of an active output power parameter from the at least one generator; computing a reactive power based on the variable power factor curve and the value of the active power output parameter of the at least one generator; generating a reactive power compensation command based on the computed reactive power; and transmitting the reactive power compensation command to the at least one power generator for controlling operation of the at least one power generator.

19 Claims, 6 Drawing Sheets

(56) References Cited

U.S. PATENT DOCUMENTS

| | | | |
|---|---|---|---|
| 2006/0012181 | A1 | 1/2006 | Larsen |
| 2007/0097565 | A1 | 5/2007 | Oohara et al. |
| 2008/0106099 | A1 | 5/2008 | Ichinose et al. |
| 2008/0150283 | A1 | 6/2008 | Rivas et al. |
| 2009/0021013 | A1 | 1/2009 | Andresen |
| 2010/0067271 | A1* | 3/2010 | Garces ............... H02J 3/18 363/95 |
| 2010/0094474 | A1* | 4/2010 | Larsen ............... F03D 9/003 700/287 |
| 2010/0237834 | A1 | 9/2010 | Alonso Sadaba et al. |
| 2011/0055036 | A1* | 3/2011 | Helfan ............... 705/26.1 |
| 2011/0095609 | A1* | 4/2011 | Cardinal ............... H02J 3/24 307/43 |
| 2011/0112697 | A1* | 5/2011 | Arinaga ............... F03D 7/0284 700/287 |
| 2011/0313591 | A1* | 12/2011 | Andresen ............... F03D 7/028 700/298 |

OTHER PUBLICATIONS

Thipnatee Sansawatt et al.; Decentralised Voltage Control for Active Distribution Networks; Universities Power Engineering Conference (UPEC), 2009 Proceedings of the 44th International Sep. 1-4, 2009; 5 Pages.

E. Muljadi et al. Energy Storage and Reactive Power Compensator in a Large Wind Farm; National Renewable Energy Laboratory NREL/CP-500-34701; Oct. 2003; To be presented at the 42nd AIAA Aerospace Sciences Meeting and Exhibit Reno, Nevada, Jan. 5-8, 2004; 13 Pages.

European Search Report and Written Opinion issued in connection with corresponding EP Application No. 12194406.0-1804 dated Apr. 14, 2015.

* cited by examiner

US 9,252,596 B2

SYSTEM AND METHOD FOR REACTIVE POWER COMPENSATION IN POWER NETWORKS

BACKGROUND

The invention relates to a system and method for reactive power compensation in power networks.

Electric power networks are used for transmitting and distributing electricity for various purposes. Electric networks include multiple devices interconnected with each other to generate, transmit, and distribute electricity.

Electrical power networks experience voltage variations during operation that are caused by the variation in generation of the active and the reactive power by different power generating devices and variable consumption of the active and reactive power at different loads in the electrical power network.

Electric power networks to which large amounts of renewable power generation are connected can have large and rapid voltage variations at and around the points of generation interconnection that lead to excessive operation of voltage regulating devices such as transformers and capacitors. Due to limited operating speeds of the voltage regulating devices, a constant voltage cannot be maintained at all the network buses in the power network. Furthermore, excessive operation of mechanically-switched transformer taps and capacitors leads to substantially increased maintenance and severely diminished operating life of the switched devices.

One approach for mitigating the voltage variation mentioned above is to provide a closed loop controller, with or without voltage droop characteristics. The controller further adjusts the reactive power supply to compensate the voltage variation using mechanically switched reactors and capacitors, dynamic devices such as Static VAR Compensators (SVCS) and Static Synchronous Compensators (STATCOMs). More specifically, in some renewable power generation systems the closed loop controller adjusts the operating power factor of the power converter to adjust the reactive power for mitigating the voltage variation. The closed loop controller undesirably interacts with other voltage controllers in the power network during this process. Furthermore, the closed loop controller tends to compensate for the reactive power demand of the network and connected loads, which leads to increased losses in the reactive power source and sub-optimal utilization of its dynamic capabilities.

An alternative approach for mitigating voltage variations in the power network is to individually compensate the self-induced voltage variation for each of the power generating devices. The amount of reactive power required for compensating a self-induced voltage variation is computed based on an approximate voltage drop equation which results in a constant power factor operation. However, this method is inaccurate at high power conditions and leads to overcompensation in the electric power network resulting in undesired voltage variations and increased losses.

Hence, there is a need for an improved system to address the aforementioned issues.

BRIEF DESCRIPTION

Briefly, in accordance with one embodiment, a reactive power compensation system comprises: at least one sensor for obtaining information regarding a plurality of network parameters; and a controller for generating a variable power factor curve for at least one power generator based on the information regarding the plurality of network parameters; computing a reactive power based on the variable power factor curve and a value of an active power output parameter of the at least one generator; generating a reactive power compensation command based on the computed reactive power; and transmitting the reactive power compensation command to the at least one power generator for controlling operation of the at least one power generator.

In accordance with another embodiment, a method comprises: using at least one sensor for obtaining information regarding a plurality of network parameters; generating a variable power factor curve for at least one power generator based on the information regarding the network parameters; obtaining a value of an active output power parameter from the at least one generator; computing a reactive power based on the variable power factor curve and the value of the active power output parameter of the at least one generator; generating a reactive power compensation command based on the computed reactive power; and transmitting the reactive power compensation command to the at least one power generator for controlling operation of the at least one power generator.

In accordance with another embodiment, a solar power generation system comprises: at least one solar power generator for generating power; at least one controller for: generating a variable power factor curve for the at least one power generator based on information regarding a plurality of network parameters; computing a reactive power based on the variable power factor curve and a value of an active power output parameter of the at least one generator; generating a reactive power compensation command based on the computed reactive power; and transmitting the reactive power compensation command to the at least one power generator for controlling operation of the at least one power generator.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a reactive power compensation system in a power network that reduces a voltage variation by providing reactive power based on a variable power factor characteristic. The reactive power compensation system includes at least one controller for generating a variable power factor curve for at least one power generator based at least in part on information regarding a plurality of network parameters. As used herein, "variable power factor curve" includes a curve with variable power factor data, variable reactive power data, or both types of data. In an optional embodiment, the network parameters may include data and forecasts of loads and generation devices. The at least one controller additionally may again generate or adjust the variable power factor curve over time based on changes in the information regarding the plurality of network parameters. The at least one controller further computes a reactive power based on the variable power factor curve and a value of an active power output parameter for the at least one power generator. The at least one controller also generates a reactive power compensation command for the at least one power generator and further transmits the reactive power compensation command to the at least one power generator.

Figure 1:
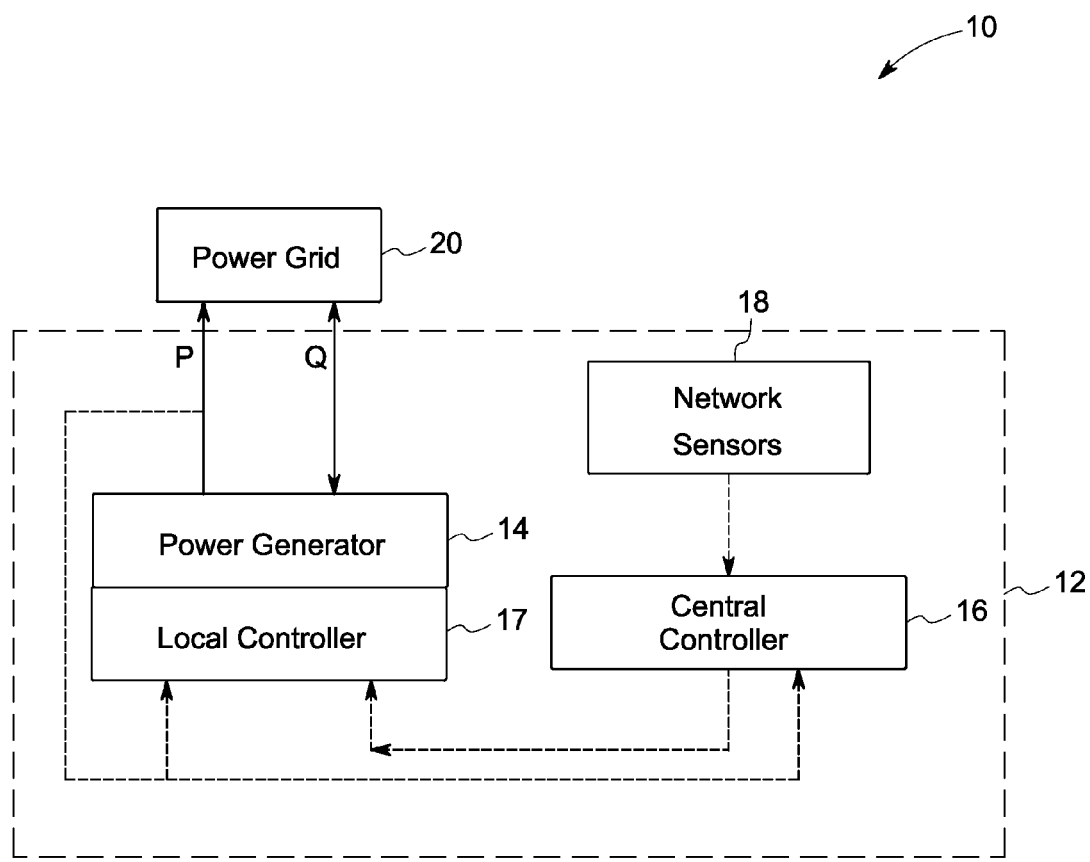
FIG. 1 is a block diagram representation of a power network including a reactive power compensation system in accordance with an embodiment of the invention.

FIG. 1 is a block diagram representation of a power network 10 including a reactive power compensation system 12 in accordance with an embodiment of the invention. The power network 10 includes a power generator 14 that generates power. Any appropriate power generator 14 capable of providing reactive power may be used with several non-limiting examples including photovoltaic, wind, and hydrokinetic energy sources coupled to the power grid via power conversion equipment (not shown). The reactive power compensation system 12 comprises of at least one controller 16 that is shown for illustrative purposes in FIG. 1 as including two controllers 16, 17. Controller 16 computes power factor characteristics for the at least one power generator 14 based on information regarding a plurality of network parameters representing a variety of conditions to arrive at a curve representative of power factor (that is, a curve of active vs. reactive power or a curve of active power vs. power factor). The information regarding the network parameters may be obtained from network sensors 18, for example. In a more specific embodiment, the plurality of network parameters include electrical parameters of the different components in the network, such as transmission lines and transformers, as well as the network topology and the location of the power generator 14 in the power grid 20. An initial set of the electrical parameters may be pre-installed in the controller 16. In one embodiment, the network parameters further include data related to load, generation, load forecasting, and generation forecasting.

In one embodiment, the at least one controller 16 comprises a central controller that is coupled to a plurality of power generators (not shown) and computes a respective variable power factor curve of each power generator 14. Then, either the central controller 16 or a local controller 17 uses the respective variable power factor curve along with information on the output power P from the power generator to obtain a reactive power of the power generator and compute a compensation command to compensate for the self-induced voltage variations of that power generator at the point of interconnection. As network conditions change over time, it is useful to generate new (or "adjust") variable power factor curves over time as well. Curve generation/adjustment may be done on scheduled basis, a random basis, or upon the occurrence of a triggering event, such as a significant change in information regarding a network parameter such as a forecast, for example. During the period wherein such adjustments are being generated, the power generators operate using the most recent power factor curve available to them.

When generating a variable power factor curve, the controller 16 computes a voltage ($V_o$) at the point of interconnection based on information regarding the plurality of network parameters for each of the power generators 14 assuming that the active and reactive power of the power generator 14 is zero and a certain network loading condition is available. The voltage ($V_o$) at the point of interconnection in the absence of the power generator 14 is stored for each available loading condition. More specifically, if the loading conditions are unavailable, all loads and power generators 14 are assumed to have zero active and reactive power. If only minimum and maximum load and power generation data is available, the most prevailing network loading conditions are considered. Furthermore, if load and generation forecasting for a certain time period is available, this information is additionally used in the simulation for that that particular time period.

The controller 16 simulates step wise increases in the active power output of each of the power generators 14 for each available network load condition from zero to maximum power and computes a reactive power required at each power step to bring a voltage ($V_i$) at the point of interconnection back to the value of previously calculated voltage ($V_o$) at the point of interconnection for the corresponding loading condition. The controller 16 generates the variable power factor curve based on the computed reactive power required at each power step in the simulation. The controller may also adjust the variable power factor curve over time based on available load and data forecast changes, if available. In one embodiment, the variable power factor curve is computed by a central controller situated at a distribution station in the power network. In another embodiment, a local controller may alternatively or additionally be used. In one specific embodiment, a central controller 16 is coupled to a plurality of local controllers (only one of which is shown as local controller 17 in FIG. 1) at respective power generators and generates a variable power factor curve for each controller on a periodic basis. In an even more specific example, the central controller generates the variable power factor curves on a daily basis and further adjusts the curves during the day if forecasts are substantially altered.

When using a variable power factor curve, the controller then determines the active power output from the power generator at any given time and uses the active power and the variable power factor curve to identify a corresponding reactive power from the variable power factor curve to compensate the voltage variation in the power network. In one example, if the variable power factor curve is a curve of active power vs. reactive power, then the controller may obtain the reactive power value directly from the curve. In another example, if the variable power factor curve is a curve of active power vs. power factor, then the controller obtains the power factor from the curve and computes the reactive power from the power factor. The controller then generates a reactive power compensation command and transmits the reactive power compensation command to the power conversion portion of the power generator to mitigate the voltage variation.

Figure 2:
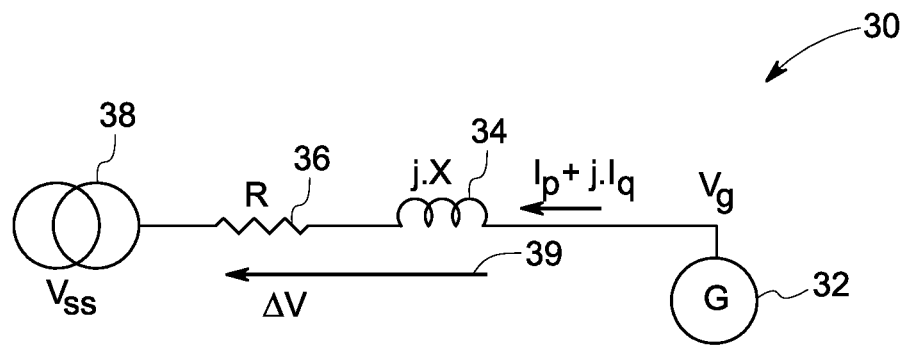
FIG. 2 is a schematic representation of a power network depicting a real and imaginary part of the voltage and the current in the power network in accordance with an embodiment of the invention.

FIG. 2 is a schematic representation of a power network 30 depicting the real and imaginary part of voltage and current in accordance with an embodiment of the invention. The power network 30 includes the power generator 32 that supplies an active current ($I_p$) to the power network 30 at a voltage ($V_g$) at the point of interconnection. The power network 30 includes an inductor 34 including a reactance (X) and a resistor 36 including a resistance (R). The power network 30 includes a transformer 38 having a voltage ($V_{ss}$) at the low voltage side that receives the current ($I_p$) from the power generator 32 through the inductor 34 and the resistor 36. The voltage across the resistor 36 and the inductor 34 is depicted by voltage drop vector 39.

Figure 3:
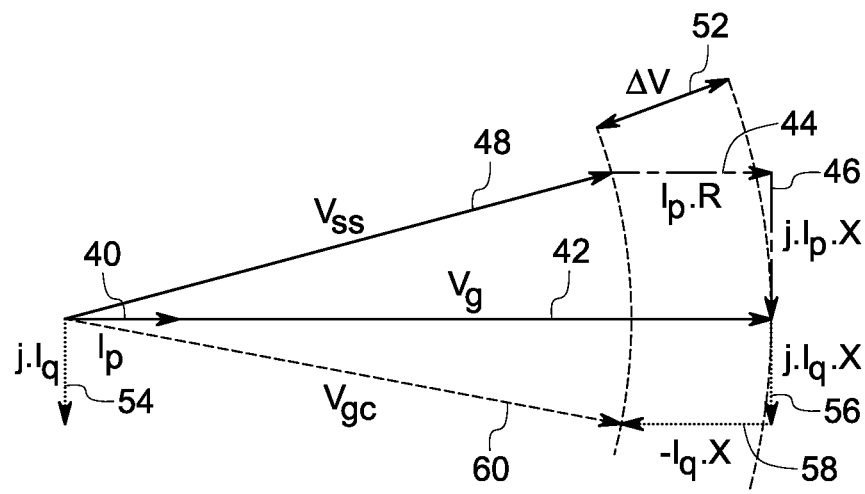
FIG. 3 is a schematic phasor representation of voltage and current characteristics in a power network depicting the variation in voltage magnitude and phase due to active and reactive currents.

Turning to FIG. 3, the current ($I_p$) supplied by the power generator 32 is depicted by an active current vector 40. The active current is in phase with the generator voltage ($V_g$) at the point of interconnection represented by generator voltage vector 42. The voltage due to the current ($I_p$) over the inductor 34 is represented by voltage vector 46. The voltage due to the current ($I_p$) over the resistor 36 is represented by voltage vector 44. The voltage ($V_{ss}$) at the transformer at the low voltage side is represented by voltage vector 48. The voltage ($V_g$) at the point of interconnection in the absence of any reactive compensation is also represented by the voltage vector 42. The voltage vector 39 (FIG. 2) is the voltage across the resistance (R) and reactance (X) between the point of interconnection and the transformer stationed at the substation due to the flow of the active current ($I_p$) and reactive current ($I_q$).

The voltage variation due to the active current of the power generator 32 is ΔV represented by the vector 52. The reactive current ($I_q$) required from the power generator 32 to compensate for the voltage variation caused by the active current ($I_p$) is represented by the current vector 54. The reactive current ($I_q$) is orthogonal to the voltage ($V_g$) at the point of interconnection. The voltage over the resistance R due to the reactive current $I_q$ is represented by the voltage vector 56. The voltage over the reactance X due to the reactive current ($I_q$) is represented by the voltage vector 58. The voltage ($V_g$) at the point of interconnection with the reactive compensation is represented by the voltage vector 60. The voltage variation ΔV after the reactive compensation is zero.

Unlike the present invention, in some conventional reactive power compensation techniques, reactive power compensation is based on a constant power factor assumption. In such techniques, the amount of reactive current or alternatively reactive power is calculated based on the approximation of the voltage drop equation, where the imaginary part of the voltage vector 39 is ignored. The approximate voltage drop is hence given as $$\Delta V = (I_p \cdot R - I_q \cdot X)$$

If the approximation of the voltage vector 39 is set to zero, the reactive current ($I_q$) required to compensate for the voltage variation due to the active current ($I_p$) is constant proportion to the active current ($I_p$)

$$I_q = I_p \cdot R / X$$

The constant power factor is hence given as $$pf = \cos\left(\tan^{-1}\left(\frac{R}{X}\right)\right)$$

In such conventional embodiments, the reactive current computed based on the constant power factor is generated to compensate only the voltage variation caused by the voltage over the resistance R due to the active current $I_p$. The voltage variation caused by the voltage over the reactance X due to the active current $I_p$, as well as the voltage over the resistance R due to the reactive current $I_q$ is ignored. This approximation leads to overcompensation of the self-induced voltage variations, especially when the value of the active current $I_p$ is large.

In contrast, embodiments of the present invention involve reactive power compensation wherein the reactive power is generated based on a variable power factor. In these embodiments, the amount of reactive current or alternatively reactive power is calculated based on a more exact voltage drop equation. If the compensation is directed to drive the voltage vector 39 to zero, the reactive current ($I_q$) required to compensate for the voltage variation due to the active current ($I_p$) is variable in proportion to the active current ($I_p$). The calculated power factor is hence also variable.

The reactive current computed based on the variable power factor may be generated to compensate the voltage variation over both the resistance R and the reactance X due to the active current $I_p$. The compensated grid voltage ($V_{gc}$) vector 60 depicts a compensated grid voltage generated by the variable power factor approach. The reactive power required for compensating the voltage drop (ΔV) is of a more exact amount in the variable power factor approach as compared to the constant power factor approach.

Figure 4:
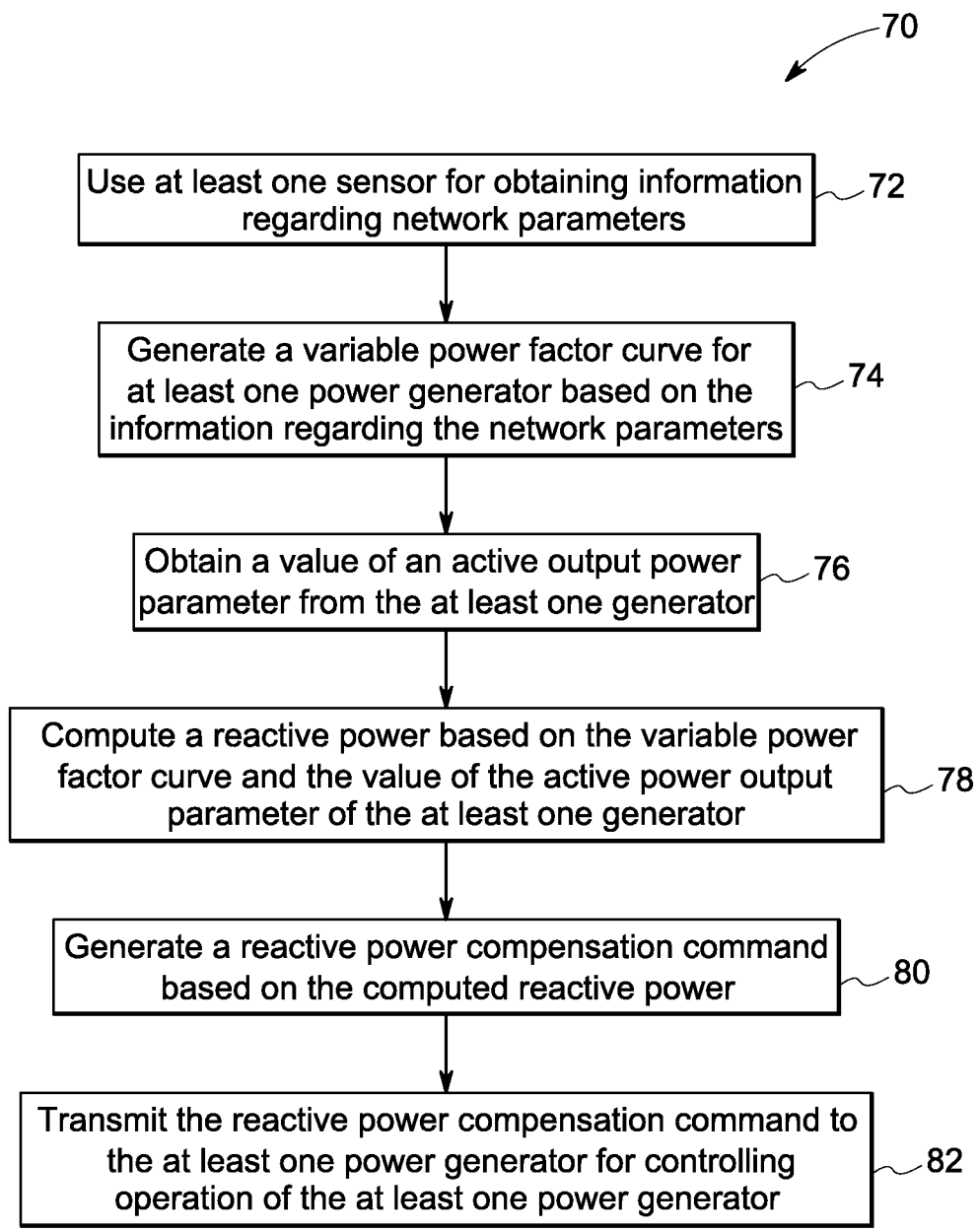
FIG. 4 is a flow chart representing steps involved in a method for reactive power compensation in a power network based on a variable power factor in accordance with an embodiment of the invention.

FIG. 4 is a flow chart representing the steps involved in a method 70 for compensating reactive power in a power network in accordance with an embodiment of the invention. The method 70 includes identifying information regarding a plurality of network parameters in step 72. In one embodiment, identifying information regarding the plurality of network parameters comprises identifying information regarding electrical parameters of the different components in a power network and a topology of the power network. In another embodiment, the method 70 further comprises identifying information regarding the plurality of network parameters comprise identifying a load and generation data and a load and generation forecasting data. In step 76, a variable power factor curve is generated based upon the information regarding the network parameters. This variable power factor curve may be adjusted over time as the information regarding the various network parameters change. The method 70 also includes computing a reactive power based on the variable power factor curve and an active power output from the at least one power generator in step 78. A reactive power compensation command is generated for the at least one power generator in step 80. At step 82, the reactive power compensation command is transmitted to the at least one power generator. In one embodiment, the variable power factor curve is generated on a periodic basis. In a more specific embodiment, the variable power factor curve is generated at a similar frequency as of a distribution management system, for example every 10 minutes. The reactive power compensation command may be generated instantaneously on a continuous basis during the day.

Figure 5:
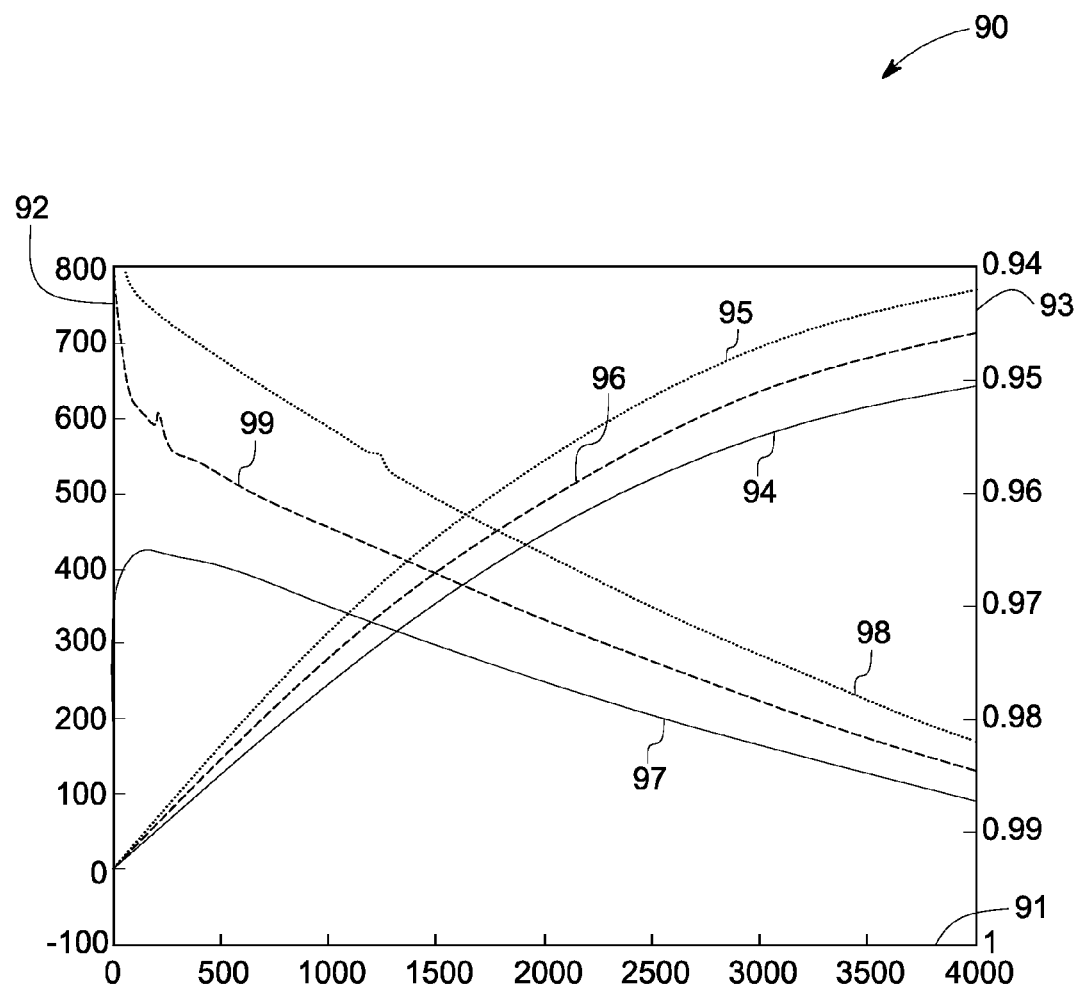
FIG. 5 is an exemplary graphical representation of a variable power factor curve for identifying reactive power for compensation in a power network for a minimum loading condition, maximum loading condition, and mean loading condition in accordance with an embodiment of the invention.

FIG. 5 is an exemplary graphical representation 90 of variable power factor curve for identifying reactive power for compensation in a power network for a minimum loading condition, maximum loading condition, and mean loading condition in accordance with an embodiment of the invention. X axis 91 represents an active power in kilowatts. Y axis 92 represents a reactive power in Kilo volt ampere reactive (KVAr). Z axis 93 represents a variable power factor. Curves 94, 95 and 96 represent reactive power at a minimum loading condition, a maximum loading condition, and a mean loading condition respectively. Curves 97, 98, 99 represent a variable power factor at a minimum loading condition, a maximum loading condition, and a mean loading condition respectively.

In one example, mean loading condition curves 96 and 99 are used for reactive power compensation when the load forecast is unavailable.

Figure 6:
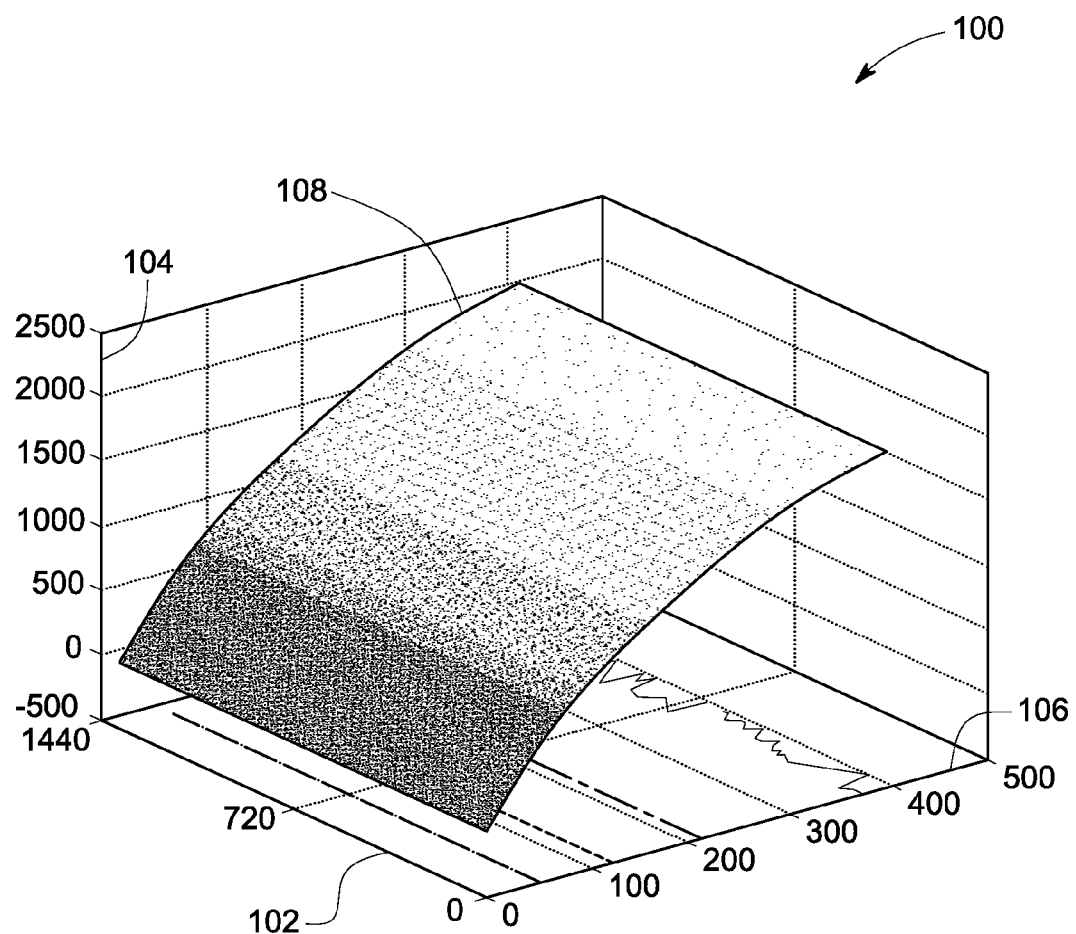
FIG. 6 is a three dimensional graphical representation of a reactive power compensation based on variable power factor including load forecasts based on time in accordance with an embodiment of the invention.

FIG. 6 is a three dimensional graphical representation 100 of reactive power compensation in a power network with a variable power factor with a 24 hour load forecast in relation to time in accordance with an embodiment of the invention. X-axis 102 represents time in minutes. Y-axis 104 represents reactive power in kilo volt amperes reactive. Z-axis 106 represents active power in kilowatts. The three-dimensional curve 108 represents the required reactive power for compensating the self-induced voltage variations by the generator device. As illustrated, the controller generates the variable power factor curve 108 based on the load forecasts available to the controller for loads connected to the grid at different times of the day. In one embodiment, the variable power factor curve may be adjusted over time based on availability of additional load and load forecasting data.

Figure 7:
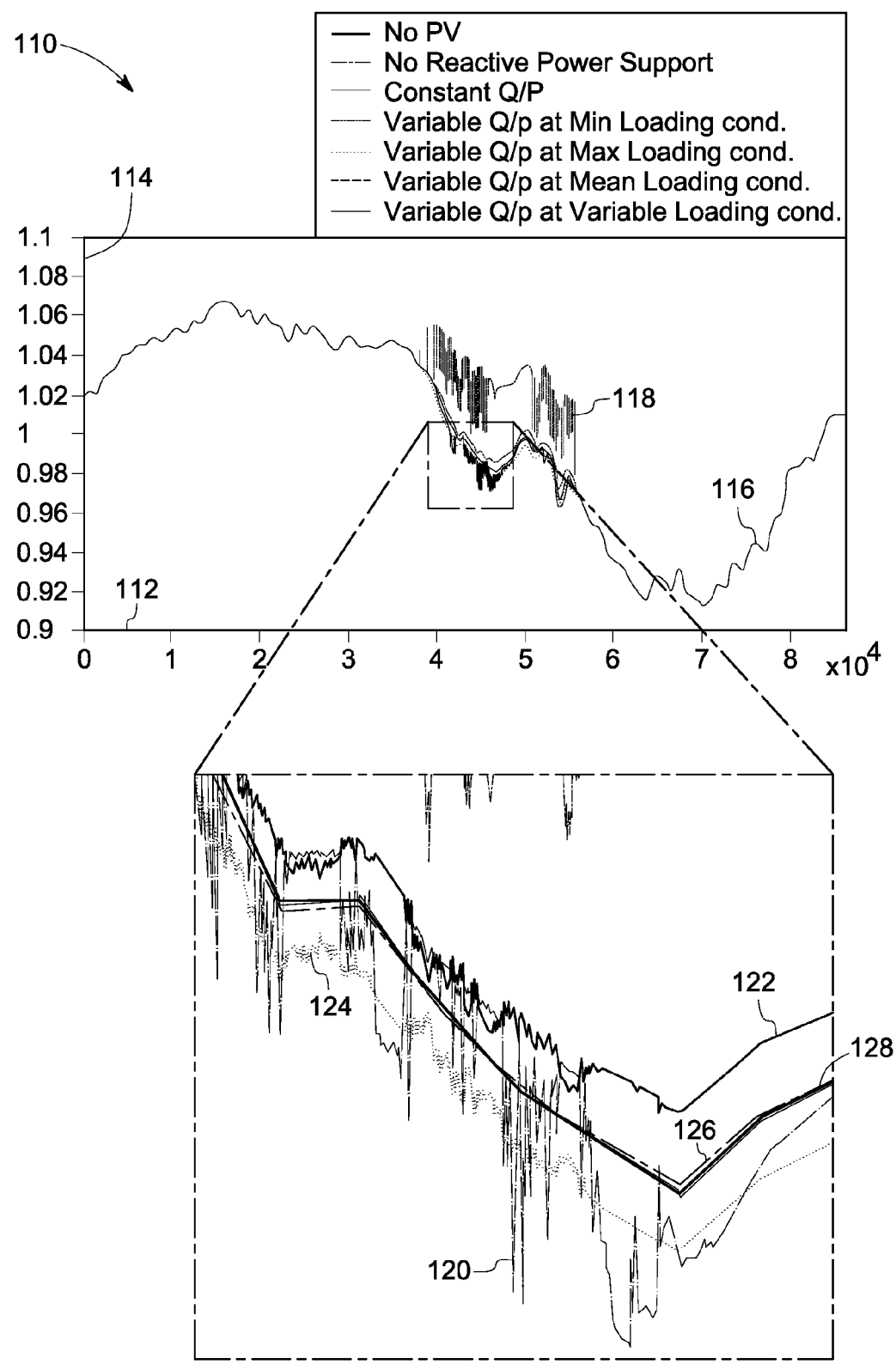
FIG. 7 is a graphical representation of a simulation conducted for reactive power compensation in a power network with constant power factor and a variable power factor in accordance with an embodiment of the invention.

FIG. 7 is a graphical representation 110 of a number of simulations conducted for comparing reactive power compensation in a power network with a constant power factor and reactive compensation in a power network with a variable power factor in accordance with an embodiment of the invention. X-axis 112 represents time in seconds. Y-axis 114 represents voltage at the point of interconnection per unit in volts. The variable power factor is obtained for different network loading conditions.

The first simulation is conducted without PV power injection. The voltage at the point of interconnection is shown by the curve 116. The voltage variations are only due to the variation of the network loads.

The second simulation is conducted with PV power injection at unity power factor, i.e. without reactive power support. The voltage at the point of interconnection is shown by the curve 118. The voltage variations are due to the variation of PV active power, in addition to the variation of the network loads.

The third simulation is conducted with PV power injection and a constant power factor based on the resistance (R) and reactance (X) between the point of interconnection and the substation. The voltage at the point of interconnection is shown by the curve 120. The voltage variations are due to the variation of PV active and reactive power, in addition to the variation of the network loads.

The forth simulation is conducted with PV power injection and a variable power factor curve calculated assuming minimum load conditions at all network loads. The voltage at the point of interaction is shown by the curve 122. The voltage variations are due to the variation of PV active and reactive power, in addition to the variation of the network loads.

The fifth simulation is conducted with PV power injection and a variable power factor calculated curve assuming maximum load conditions at all network loads. The voltage at the point of interaction is shown by the curve 124. The voltage variations are due to the variation of PV active and reactive power, in addition to the variation of the network loads.

The sixth simulation is conducted with PV power injection and a variable power factor curve calculated assuming mean load conditions at all network loads. The voltage at the point of interaction is shown by the curve 126, which is close to the curve 116. The voltage variations are due to the variation of PV active and reactive power, in addition to the variation of the network loads.

The seventh and final simulation is conducted with PV power injection and the reactive power compensation based on the three dimensional variable power factor curve (FIG. 6), which is calculated assuming the availability of a 24 hour load forecast. The voltage at the point of interconnection is shown by the curve 128, which is identical to the curve 116. The voltage variations are due to the variation of PV active and reactive power, in addition to the variation of the network loads.

As illustrated, the PV injection at unity power factor leads to an increase of the voltage at the point of interconnection and also to large dynamic variations caused by the fast variability in the PV active power injection. The constant power factor compensation helps in compensating the voltage increase but leads to a certain level of compensation inaccuracy at high active power injection levels. The variable power factor curves calculated at minimum, maximum, and mean load conditions are more effective in damping the dynamic variations in the voltage. The most accurate of the three options is the compensation based on the variable power factor curve calculated at mean load conditions at all network loads. In a more specific embodiment, the mean load conditions comprise weighted mean load conditions. Weighting is useful because the network load is close to its mean value during the time period of highest PV power. The most accurate results are given by the compensation based on the three-dimensional variable power factor curve, which is calculated assuming the availability of a 24 hour load forecast. Due to the assumption of a perfect forecast, the voltage variation at the point of interconnection with PV power injection is identical to the voltage variation at the point of interconnection without PV power injection, which means the self-induced voltage variations by the generator device is more fully compensated.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A reactive power compensation system, comprising:
at least one sensor for obtaining information regarding a plurality of network parameters;
a controller for:
generating a variable power factor curve for a minimum loading condition, a maximum loading condition, and a mean loading condition for at least one power generator based on the information regarding the plurality of network parameters;
computing a reactive power based on the variable power factor curve and a value of an active power output parameter of the at least one power generator;
generating a reactive power compensation command based on the computed reactive power;
transmitting the reactive power compensation command to the at least one power generator for controlling operation of the at least one power generator; and
damping dynamic variations in voltage based on the variable power factor curve generated for the minimum loading condition, the maximum loading condition, and the mean loading condition.

2. The system of claim 1, wherein the controller comprises a central controller for generating the variable power factor curve.

3. The system of claim 2, wherein the controller further comprises a local controller for receiving the variable power factor curve, computing the reactive power based on the variable power factor curve and the value of the active power output parameter, generating the reactive power compensation command, and transmitting the reactive power compensation command.

4. The system of claim 1, wherein the plurality of network parameters comprises electrical parameters of components in a power network.

5. The system of claim 4, wherein the plurality of network parameters further comprises load and generation forecasting data.

6. The system of claim 1, wherein the controller is configured for generating the variable power factor curve on a periodic basis and for computing the reactive power compensation command on a continuous basis.

7. A method comprising:
    using at least one sensor for obtaining information regarding network parameters;
    generating a variable power factor curve for a minimum loading condition, a maximum loading condition, and a mean loading condition for at least one power generator based on the information regarding the network parameters;
    obtaining a value of an active output power parameter from the at least one power generator;
    computing a reactive power based on the variable power factor curve and the value of the active power output parameter of the at least one power generator;
    generating a reactive power compensation command based on the computed reactive power;
    transmitting the reactive power compensation command to the at least one power generator for controlling operation of the at least one power generator; and
    damping dynamic variations in voltage based on the variable power factor curve generated for the minimum loading condition, the maximum loading condition, and the mean loading condition.

8. The method of claim 7, wherein obtaining the information regarding the plurality of network parameters comprises obtaining electrical parameter information regarding components in a power network.

9. The method of claim 8, further comprising adjusting the variable power factor curve upon detection of changes in load forecasting data, generation forecasting data, or both the load and generation forecasting data.

10. The method of claim 7, wherein generating the variable power factor curve comprises generating the variable power factor curve on a periodic basis and computing the reactive power compensation command on a continuous basis.

11. A solar power generation system, comprising:
    at least one solar power generator for generating power;
    at least one controller for:
        generating a variable power factor curve for a minimum loading condition, a maximum loading condition, and a mean loading condition for the at least one solar power generator based on information regarding a plurality of network parameters;
        computing a reactive power based on the variable power factor curve and a value of an active power output parameter of the at least one solar power generator;
        generating a reactive power compensation command based on the computed reactive power;
        transmitting the reactive power compensation command to the at least one solar power generator for controlling operation of the at least one solar power generator; and
        damping dynamic variations in voltage based on the variable power factor curve generated for the minimum loading condition, the maximum loading condition, and the mean loading condition.

12. The system of claim 11, wherein the at least one controller comprises a central controller for generating the variable power factor curve.

13. The system of claim 12, wherein the at least one controller further comprises a local controller for receiving the variable power factor curve, computing the reactive power based on the variable power factor curve and the active power output, generating the reactive power compensation command, and transmitting the reactive power compensation command.

14. The system of claim 11, wherein the plurality of network parameters comprises electrical parameters of components in a power network.

15. The system of claim 14, wherein the plurality of network parameters further comprises load and generation forecasting data.

16. The system of claim 15, wherein the at least one controller is configured for adjusting the variable power factor curve upon detection of changes in load forecasting data, generation forecasting data, or both the load and generation forecasting data.

17. The system of claim 11, wherein the at least one controller is configured for generating the variable power factor curve on a periodic basis and for computing the reactive power compensation command on a continuous basis.

18. The system of claim 17, wherein the at least one controller is configured for adjusting the variable power factor curve in between periodic generations of the variable power factor curve in response to changes in the information regarding the network parameters.

19. The method of claim 11, wherein the at least one controller is further configured to mitigate voltage variation of the at least one solar power generator based on the reactive power compensation command transmitted to the at least one solar power generator.

* * * * *

UNITED STATES PATENT AND TRADEMARK OFFICE
CERTIFICATE OF CORRECTION

| | | |
|---|---|---|
| PATENT NO. | : 9,252,596 B2 | Page 1 of 1 |
| APPLICATION NO. | : 13/304935 | |
| DATED | : February 2, 2016 | |
| INVENTOR(S) | : Panosyan et al. | |

It is certified that error appears in the above-identified patent and that said Letters Patent is hereby corrected as shown below:

In the Specification

In Column 1, Line 36, delete "(SVCS)" and insert -- (SVCs) --, therefor.

In the Claims

In Column 10, Line 50, in Claim 19, delete "The method" and insert -- The system --, therefor.

Signed and Sealed this
Third Day of May, 2016

Michelle K. Lee
*Director of the United States Patent and Trademark Office*